United States Patent
Youkai et al.

(10) Patent No.: US 7,612,511 B2
(45) Date of Patent: Nov. 3, 2009

(54) LOAD DRIVE APPARATUS

(75) Inventors: Masatoshi Youkai, Kariya (JP); Satoshi Yoshimura, Kariya (JP); Akira Andoh, Nagoya (JP)

(73) Assignee: Denso Corporation, Kariya (JP)

( * ) Notice: Subject to any disclaimer, the term of this patent is extended or adjusted under 35 U.S.C. 154(b) by 245 days.

(21) Appl. No.: 11/783,062

(22) Filed: Apr. 5, 2007

(65) Prior Publication Data
US 2007/0241702 A1  Oct. 18, 2007

(30) Foreign Application Priority Data
Apr. 12, 2006 (JP) ............... 2006-109597
Jan. 15, 2007 (JP) ............... 2007-005955

(51) Int. Cl.
*H02P 6/00* (2006.01)
(52) U.S. Cl. ............... 318/400.25; 318/400.24; 318/629; 318/724
(58) Field of Classification Search ............... 318/254, 318/400.25, 400.41, 724, 748, 531, 400
See application file for complete search history.

(56) References Cited

U.S. PATENT DOCUMENTS

| | | | | |
|---|---|---|---|---|
| 3,424,962 A | * | 1/1969 | Gawron | 318/400.09 |
| 5,049,788 A | * | 9/1991 | Lee | 315/219 |
| 6,249,103 B1 | * | 6/2001 | Alvaro et al. | 318/700 |
| 6,362,463 B1 | * | 3/2002 | Bessyo et al. | 219/715 |
| 7,274,161 B2 | * | 9/2007 | Mori et al. | 318/400.36 |
| 7,348,744 B2 | * | 3/2008 | Liao et al. | 318/434 |
| 2005/0174076 A1 | * | 8/2005 | Katanaya | 318/254 |
| 2006/0221655 A1 | * | 10/2006 | Nakahori | 363/47 |

FOREIGN PATENT DOCUMENTS

| | | |
|---|---|---|
| JP | A-05-260728 | 10/1993 |
| JP | A 2001-23809 | 1/2001 |
| JP | A 2001-23811 | 1/2001 |

* cited by examiner

*Primary Examiner*—Jeffrey Donels
*Assistant Examiner*—Forrest M Phillips
(74) *Attorney, Agent, or Firm*—Oliff & Berridge, PLC

(57) ABSTRACT

A load drive apparatus includes a noise filter, which includes a coil connected in series between a power source and a load, and a switching transistor connected in parallel across the coil, and a control circuit which is operated based on a drive signal. The control circuit turns on the switching transistor of the noise filter in case of subjecting the load to a full-on drive, thereby to short-circuit the coil and to form a power supply path including the switching transistor without the coil. The control circuit turns off the switching transistor of the noise filter in case of subjecting the load to a PWM drive, thereby to form a power supply path including the coil.

6 Claims, 5 Drawing Sheets

FULL-ON DRIVE

PWM DRIVE

LOAD DRIVE APPARATUS

CROSS REFERENCE TO RELATED APPLICATION

This application is based on and incorporates herein by reference Japanese Patent Applications No. 2006-109597 filed on Apr. 12, 2006 and No. 2007-5955 filed on Jan. 15, 2007.

FIELD OF THE INVENTION

The present invention relates to a load drive apparatus, which drives an electric load by applying a voltage of a power source.

BACKGROUND OF THE INVENTION

A conventional load drive circuit, which performs the switching control of an electric load such as a motor, adopts a noise filter for reducing noise that occurs at the switching of the load. In such a noise filter, however, a coil acts as a resistor, so a supply voltage to be fed to the load is reduced.

In this regard, a method for lowering the loss of the noise filter has been proposed in JP 2001-23809A and JP 2001-23811A. Specifically, powder of Fe—Ni-based soft magnetic alloy being a composite magnetic substance of high permeability is employed as a metallic composite magnetic material of high performance for the noise filter, and a compressed powder magnetic core made by the compression molding of the powder is used.

With the method in JP 2001-23809A, the loss of the noise filter is lowered by enhancing the material characteristics of the magnetic material employed for the noise filter. However, the configuration of the noise filter employing the coil is the same as that of the conventional noise filter, and hence the resistance of the coil cannot be nullified completely. Accordingly the supply voltage to be fed to the load is reduced by the coil in the noise filter.

SUMMARY OF THE INVENTION

The present invention therefore has an object to provide a load drive apparatus, which can attain lowering in the loss of a noise filter.

According to one aspect, a load drive apparatus, which drives a load with a power source, includes a noise filter and a control circuit for the noise filter and the load. A first switch is provided to full-on drive or switching drive the load by controlling supply of power from the power source to the load. The noise filter includes a coil and a second switch. The coil is connected in series between the power source and the load, and the second switch is connected in parallel with, at least, part of the coil. The control circuit drives the load by turning on or off the first switch. The control circuit turns off the second switch thereby to filter noise appearing on a power supply path including the coil. The control circuit turns on the second switch thereby to short-circuit, at least, a part of the coil between the power source and the load.

It is noted that the switching drive includes both a PWM drive and a duty drive. In the PWM drive, a pulse width is changed with the interval of pulses held constant. In the duty drive, the cycle of turn-on is changed within a predetermined cycle.

BRIEF DESCRIPTION OF THE DRAWINGS

The above and other objects, features and advantages of the present invention will become more apparent from the following detailed description made with reference to the accompanying drawings. In the drawings.

DESCRIPTION OF THE PREFERRED EMBODIMENTS

First Embodiment

Figure 1:
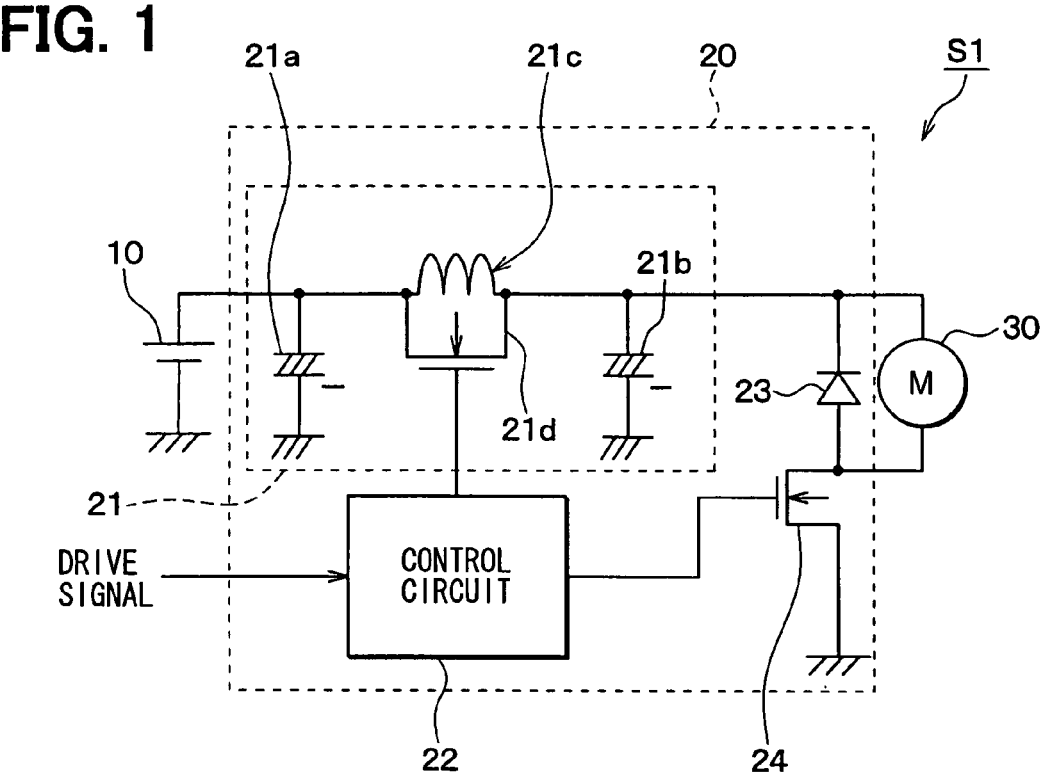
FIG. 1 is a circuit diagram of a DC motor control apparatus according to a first embodiment of the present invention.

Referring to FIG. 1 showing a first embodiment, a DC motor control system S1 includes a power supply (DC voltage storage battery) 10, a load drive apparatus 20 and a load (electric DC motor) 30.

The load drive apparatus 20 is provided to perform a PWM control for the switching drive of the load 30 and to eliminate switching noise, which occurs due to the PWM control on the load 30. It is configured to include a noise filter 21, a control circuit 22, a diode 23, and a transistor 24 for the PWM control. The transistor 24 operates as first switch means.

The noise filter 21 serves to eliminate switching noise, which occurs due to the switching drive of the PWM-control transistor 24. Accordingly, the noise filter 21 is interposed between the power source 10 and the load 30, and functions to eliminate the noise from a wiring line for applying the DC voltage of the power source 10. The noise filter 21 is configured to include capacitors 21a and 21b, a coil 21c and a switching transistor 21d. The switching transistor 21d operates as second switch means.

Specifically, in the noise filter 21, a noise filter of Π type of CLC is configured of the two capacitors 21a and 21b and the coil 21c. The noise elimination is done by the Π type noise filter. Besides, the coil 21c is connected in series between the power source 10 and the load 30.

The switching transistor 21d is connected to, at least, part of the coil 21c. More specifically, the drain and source of the switching transistor 21d are respectively connected to both ends of the coil 21c, and the gate of the same is connected to the control circuit 22. In addition, a switch signal is inputted from the control circuit 22 to the gate of the switching transistor 21d, whereby the switching transistor 21d is turned on/off. In this embodiment, an N-channel type MOSFET, for example, is adopted as the switching transistor 21d.

The control circuit 22 is fed with the drive signal for driving the load 30 from an external side, so as to drive the load 30. Specifically, in a case where the control circuit 22 is fed with the drive signal for subjecting the load 30 to a full-on drive (at a duty ratio of 100%), it outputs a switch signal for turning on the switching transistor 21d. That is, both ends of the coil 21c are short-circuited.

Besides, in a case where the control circuit 22 is fed with the drive signal for subjecting the load 30 to the pulse-width modulation (PWM) drive, it generates a load signal corresponding to a pulse width in the PWM drive and outputs the load signal to the PWM-control transistor 24, thereby to subject the PWM-control transistor 24 to the PWM drive. Further, since the switching noise occurs in the PWM-control transistor 24 in accordance with the PWM control, the control circuit 22 outputs a switch signal for turning off the switching transistor 21d, in order to eliminate the noise by the noise filter 21.

The control circuit 22 having the above functions is configured to include a microcomputer that includes a CPU, a memory in which a drive program for driving the PWM-control transistor 24 is stored, etc. Besides, the drive signal which is externally inputted to the control circuit 22 may be, for example, a duty signal whose drive frequency is 25 Hz-5 kHz. The diode 23 is connected across both ends of the load 30, and it serves to prevent the reverse flow of a current flowing through the load 30.

The PWM-control transistor 24 serves to subject the load 30 to the PWM control. This PWM-control transistor 24 is connected between the low side of the load 30 and the ground of the circuitry, and the gate of the same is connected to the control circuit 22. In addition, the load signal is inputted from the control circuit 22 to the gate of the PWM-control transistor 24, whereby the PWM-control transistor 24 subjects the load 30 to the switching drive in correspondence with the duty ratio of the load signal. In this embodiment, an N-channel type MOSFET, for example, may be adopted as the PWM-control transistor 24.

The load 30 is subjected to the full-on drive or the PWM drive by the control circuit 22, and the DC motor, for example, a motor for a fan, a motor for a fuel pump, a motor for a blower in an air-conditioner, may be adopted as the load 30.

Figure 2:
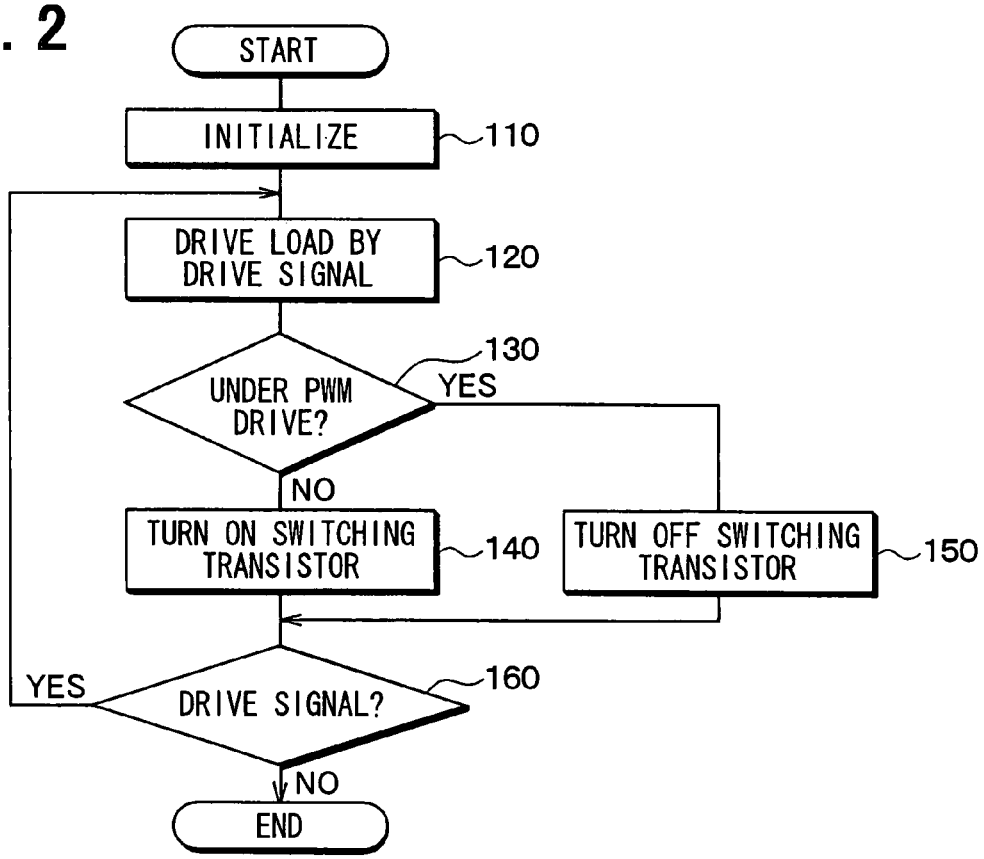
FIG. 2 is a flow diagram of a drive process for driving a PWM-control transistor in accordance with a drive signal in the first embodiment.

Next, the operation of the DC motor control system S1 will be described with reference to a drive program shown in FIG. 2. This program is for driving the PWM-control transistor 24 in accordance with the drive signal, and executed by the control circuit 22. This drive control process is started when the supply voltage is fed to the load drive apparatus 20.

Initialization is first attained at step 110, so that the switching transistor 21d of the noise filter 21 is turned off. Specifically, the switch signal for turning off the switching transistor 21d is generated by the control circuit 22, and it is outputted to the switching transistor 21d, whereby the switching transistor 21d is turned off.

At step 120, which operates as energization means, the load 30 is energized in accordance with the drive signal. More specifically, the load signal for subjecting the load 30 to the full-on drive or the PWM drive is generated in correspondence with the duty ratio of the drive signal which is externally inputted to the control circuit 22, and it is outputted to the PWM-control transistor 24, whereby the load 30 is driven in accordance with the load signal.

Figure 3:
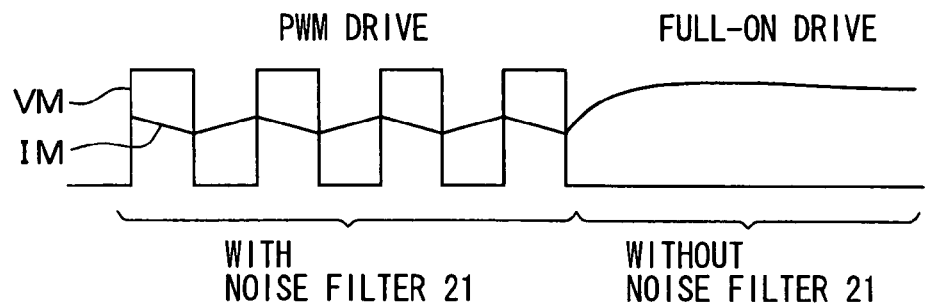
FIG. 3 is a signal diagram of waveforms of a voltage and a current which are applied to a load in case of subjecting the load to a PWM drive or a full-on drive in the first embodiment.

As shown in FIG. 3, a voltage (VM) and a current (IM) are applied to the load 30 in the case of subjecting the load 30 to the PWM drive or the full-on drive. In the case of the PWM drive of the load 30, the PWM-control transistor 24 is subjected to the switching drive, whereby a pulse-shaped voltage is applied to the load 30, and a current flows through the load 30 in correspondence with the voltage. In such a case, the switching noise occurs, and hence, the noise elimination by the noise filter 21 is necessary.

Besides, as shown in FIG. 3, in the case of the full-on drive of the load 30, the PWM-control transistor 24 is continuously turned on to bring the load 30 into a continuously energized state, and the maximum current flows through the load 30. In such a case, the switching noise ascribable to the PWM-control transistor 24 does not occur, and hence, the noise filter 21 is not necessary. In this instance, a loss in the noise filter 21 need be lowered.

It is therefore checked at step 130, which operates as switching drive decision means, whether or not the load 30 is under the switching drive (PWM drive). In a case where the load 30 is under the full-on drive, not the PWM drive, step 140 is performed. In a case where the load 30 is under the PWM drive, step 150 is performed.

At step 140, which operates as full-on drive means, both ends of the coil 21c of the noise filter 21 are short-circuited owing to the full-on drive of the load 30. Specifically, the switch signal for turning on the switching transistor 21d is outputted from the control circuit 22, whereby the switching transistor 21d is turned on. Thus, a path in which both ends of the coil 21c of the noise filter 21 are short-circuited is formed between the power source 10 and the load 30, so that the loss of the power source 10 attributed to the resistance of the coil 21c can be decreased. That is, since the ON-resistance of the transistor 21d is lower than the resistance of the coil 21c, the loss of the power source 10 can be lowered.

At step 150, which operates as switching drive means, a path which extends via the coil 21c of the noise filter 21 is formed between the power source 10 and the load 30, owing to the PWM drive of the load 30. Specifically, after the load signal has been generated by the control circuit 22, it is outputted to the PWM-control transistor 24, and the PWM-control transistor 24 is subjected to the PWM drive. Further, in subjecting the PWM-control transistor 24 to the PWM drive, the switching noise occurs in the PWM-control transistor 24. Accordingly, in order to eliminate the noise in the noise filter 21, the switch signal for turning off the switching transistor 21d of the noise filter 21 is generated by the control circuit 22. Thus, the path which extends through the noise filter 21 is formed between the power source 10 and the load 30, so that the switching noise occurring due to the PWM-control transistor 24 can be eliminated.

It is checked at step 160 whether the drive signal is inputted. That is, the presence or absence of the input of the external drive signal to the control circuit 22 is monitored. When it is determined at this step that the drive signal is not inputted, the drive of the load 30 is ended. On the other hand, when it is determined at step 160 that the drive signal is inputted, the processing returns to step 120, at which the load 30 is energized in correspondence with the drive signal again. Accordingly, while the drive signal is being inputted to the control circuit 22, the steps 120-160 are repeated. A drive cycle in which the step 160 returns to the step 120 is, for example, 4 ms-40 ms.

According to the first embodiment, the switching transistor 21d is connected in parallel with the coil 21c of the noise filter 21, and the coil 21c is short-circuited in the case of subjecting the load 30 to the full-on drive, that is, continuous-on drive.

More specifically, in the case of the full-on drive of the load 30, the PWM-control transistor 24 is continuously turned on, and hence, the switching noise does not occur due to the PWM-control transistor 24. Accordingly, the noise elimination need not be performed by the noise filter 21, and hence, the switching transistor 21d is turned on to short-circuit the coil 21c, whereby the loss of the power source 10 attributed to the coil 21c can be decreased.

In this embodiment, the MOSFET is adopted as the switching transistor 21d, so that its low ON-resistance can be realized.

Besides, in the case of subjecting the load 30 to the PWM drive, the PWM-control transistor 24 is subjected to the switching drive, and hence, the switching noise occurs due to the PWM-control transistor 24. Accordingly, the switching transistor 21d is turned off, whereby the switching noise can be eliminated by the noise filter 21.

Second Embodiment

Figure 4:
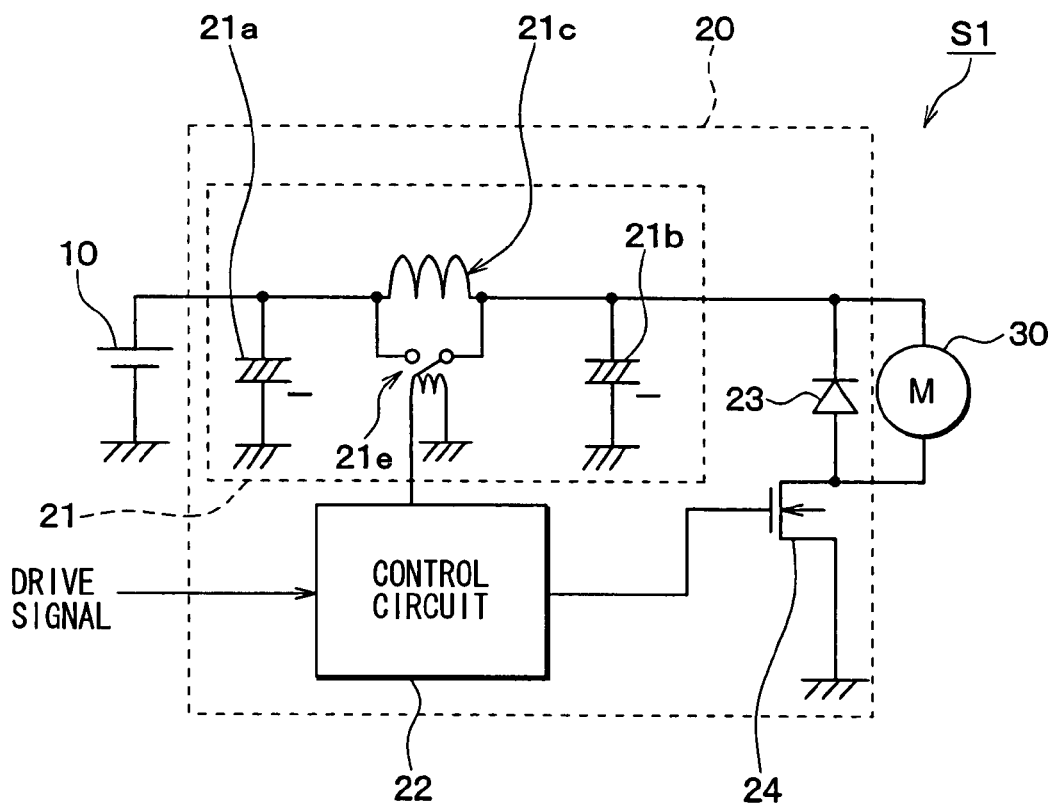
FIG. 4 is a circuit diagram of a DC motor control apparatus according to a second embodiment of the invention.

In this embodiment, as shown in FIG. 4, a relay 21e is employed as switch means for short-circuiting both ends of the coil 21c of the noise filter 21. This relay 21e is configured of, for example, a switch and an electromagnet, and a contact of the switch is connected or disconnected in accordance with the actuation of the electromagnet.

More specifically, the control circuit 22 generates a signal which turns on/off the switch of the relay 21e, as a switch signal. In addition, the control circuit 22 causes a current to flow through the electromagnet of the relay 21e, based on the switch signal, whereby the switch is turned on/off to short-circuit/open both ends of the coil 21c.

Third Embodiment

Figure 5:
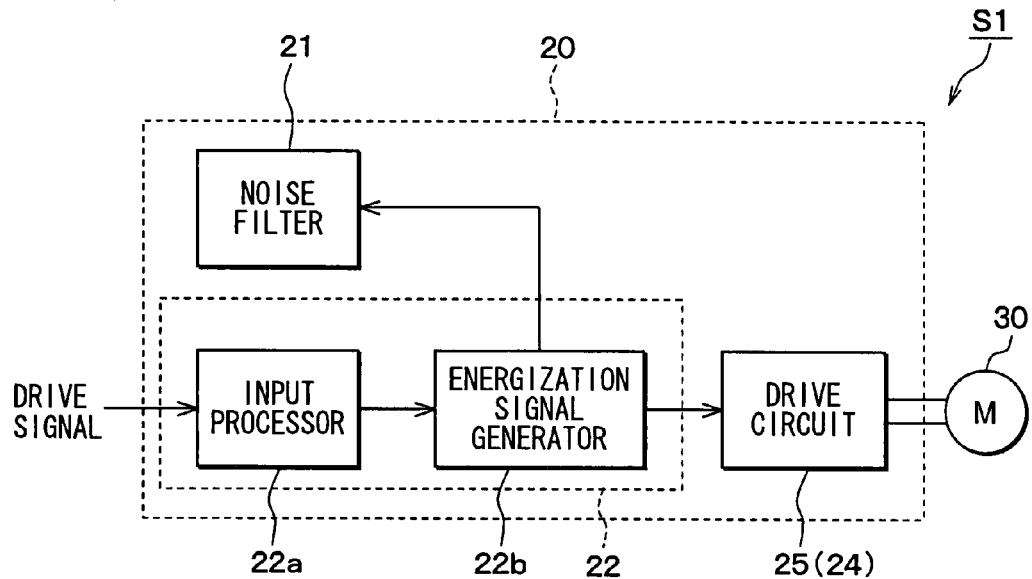
FIG. 5 is a block diagram of a DC motor control apparatus according to a third embodiment of the invention.

In this embodiment, as shown in FIG. 5, the control circuit 22 is configured of a custom integrated circuit (IC), not a microcomputer. Specifically, the load drive apparatus 20 includes the noise filter 21, the control circuit 22 and a drive circuit 25 that includes the PWM-control transistor 24. The noise filter 21 is the same as in the first embodiment, and it is so configured that the switching transistor 21d is connected across the coil 21c.

The control circuit 22 is configured to include an input signal processor circuit 22a and an energization signal generator circuit 22b. The input signal processor circuit 22a generates an on-signal for driving the load 30, based on the drive signal externally inputted, and outputs the on-signal to the energization signal generator circuit 22b. The energization signal generator circuit 22b generates a load signal for driving the load 30, in correspondence with the on-signal inputted from the input signal processor circuit 22a, and it outputs the load signal to the drive circuit 25. Also, the energization signal generator circuit 22b generates the switch signal for turning on/off the switching transistor 21d of the noise filter 21 and outputs the switch signal to the noise filter 21.

The drive circuit 25 subjects the load 30 to the full-on drive or the PWM drive in accordance with the load signal inputted from the energization signal generator circuit 22b. The drive circuit 25 includes the PWM-control transistor 24 and the diode 23 as shown in FIG. 1, and it is configured so as to feed the load 30 with the supply voltage inputted through the noise filter 21.

In operation, the drive signal for driving the load 30 is externally inputted to the input signal processor circuit 22a of the control circuit 22. In the input signal processor circuit 22a, the on-signal for subjecting the load 30 to the full-on drive is generated, and it is inputted to the energization signal generator circuit 22b. Thus, in the energization signal generator circuit 22b, the switch signal for turning on the switching transistor 21d of the noise filter 21 is generated, and it is inputted to the noise filter 21. In the noise filter 21, the switching transistor 21d is turned on in accordance with the switch signal inputted from the energization signal generator circuit 22b, whereby both ends of the coil 21c are short-circuited.

Also, in the energization signal generator circuit 22b, the load signal for normally or continuously turning on the PWM-control transistor 24 is generated in accordance with the inputted on-signal, and it is inputted to the drive circuit 25. Thus, in the drive circuit 25, that full-on drive of the load 30 in which the PWM-control transistor 24 is normally turned ON is performed in correspondence with the load signal.

On the other hand, in a case where the drive signal externally inputted to the control circuit 30 is one for subjecting the load 30 to the PWM drive, an on-signal for subjecting the load 30 to the PWM drive is generated in the input signal processor circuit 22a, and it is inputted to the energization signal generator circuit 22b. This on-signal contains information of a duty ratio in the case of the PWM drive of the load 30.

In addition, the switch signal for turning off the switching transistor 21d of the noise filter 21 is generated in the energization signal generator circuit 22b, and it is inputted to the switching transistor 21d. Thus, in the noise filter 21, the switching transistor 21d is turned off, thereby to activate the noise filter operation.

Besides, in the energization signal generator circuit 22b, the load signal for subjecting the load 30 to the PWM drive is generated, and it is inputted to the drive circuit 25. Thus, the PWM drive of the load 30, in which the PWM-control transistor 24 is subjected to the switching drive in correspondence with the load signal, is performed in the drive circuit 25.

As described above, even when the control circuit 22 is configured of the custom IC, the switching transistor 21d connected across both ends of the coil 21c of the noise filter 21 can be short-circuited or opened in correspondence with the case of subjecting the load 30 to the full-on drive or the case of subjecting the same to the PWM drive.

Fourth Embodiment

Figure 6:
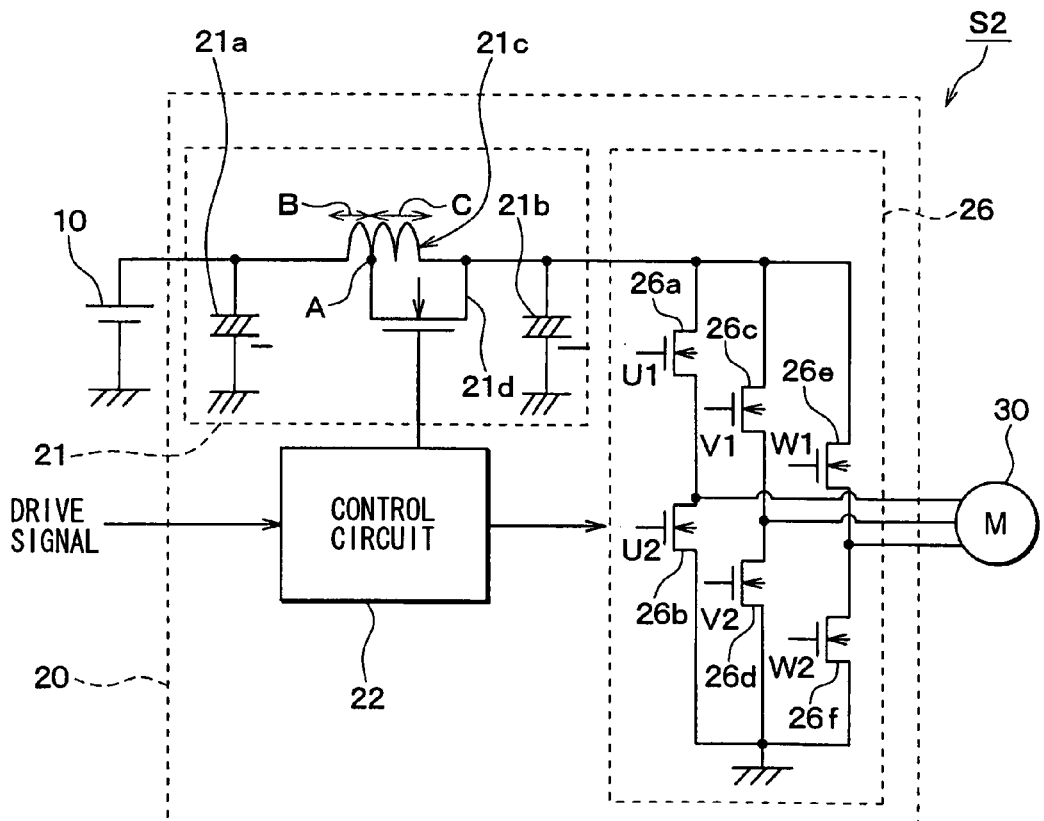
FIG. 6 is a circuit diagram of a three-phase brushless motor control apparatus according to a fourth embodiment of the invention.

This embodiment is directed to a three-phase brushless motor control system S2 as shown in FIG. 6. The three-phase brushless motor control system S2 has an inverter circuit 26 for subjecting the load 30 to switching drives in three phases in the load drive apparatus 20, which includes the noise filter 21 and the control circuit 22.

The inverter circuit 26 controls the turn-on/off of energization from the power source 10 to the load 30, in three phases. More specifically, the inverter circuit 26 applies voltages whose phases shift every 120° in electric angles, to the motor being the load 30. It is configured to include three high-side transistors 26a, 26c, 26e and three low-side transistors 26b, 26d, 26f. In addition, a first path is formed of the transistors 26a and 26b, a second path is formed of the transistors 26c and 26d, and a third path is formed of the transistors 26e and 26f. Here, the load 30 is subjected to the full-on drive or the PWM drive by the switching drives of the respective low-side transistors 26b, 26d, 26f. N-channel type MOSFETs may be respectively adopted as the high-side transistors 26a, 26c, 26e and the low-side transistors 26b, 26d, 26f.

Besides, the switching transistor 21d in the noise filter 21 is connected to, at least, part of the coil 21c. More specifically, however, the switching transistor 21d is not connected across both ends of the coil 21c so as to short-circuit this coil 21c, but the drain of the switching transistor 21d is connected to a mid-point A on the path of the coil 21c as shown in FIG. 6.

Thus, the coil 21c is configured in such a manner that a first coil B and a second coil C are connected in series at the point A, and the switching transistor 21d is in the state where it is connected in parallel with the second coil C. Accordingly, the switching transistor 21d short-circuits only a part of the coil 21c, that is, only the second coil C.

This is because the load 30 is subjected to the three-phase switching drive by the inverter circuit 26. More specifically, even when the load 30 is subjected to the full-on drive in one phase section, this load 30 is driven by the three-phase switching drive, and hence, switching noise occurs due to the three-phase switching drive. Accordingly, in order to prevent a situation where the switching noise ascribable to the three-phase switching drive cannot be eliminated by completely short-circuiting both ends of the coil 21c of the noise filter 21, the coil 21c is partially short-circuited by the switching transistor 21d, whereby the voltage decrease or loss in the coil 21c is lowered while maintaining the function of the noise elimination of the noise filter 21 to some extent.

Besides, since the load 30 is subjected to the three-phase switching drive, the control circuit 22 generates the load signals for subjecting the load 30 to the three-phase switching drive, in accordance with the drive signal externally inputted, and it inputs the load signals to the respective high-side transistors 26a, 26c, 26e and the respective low-side transistors 26b, 26d, 26f, thereby to subject the load 30 to the three-phase switching drive.

Further, the control circuit 22 generates the switch signal for turning on/off the switching transistor 21d of the noise filter 21, in correspondence with each case where the load 30 is subjected to the full-on drive or the PWM drive in the same manner as in the first and second embodiments. The three-phase brushless motor control system S2 may subject the load 30 to the three-phase switching drive, in accordance with the flow diagram shown in FIG. 2.

Figure 7A:
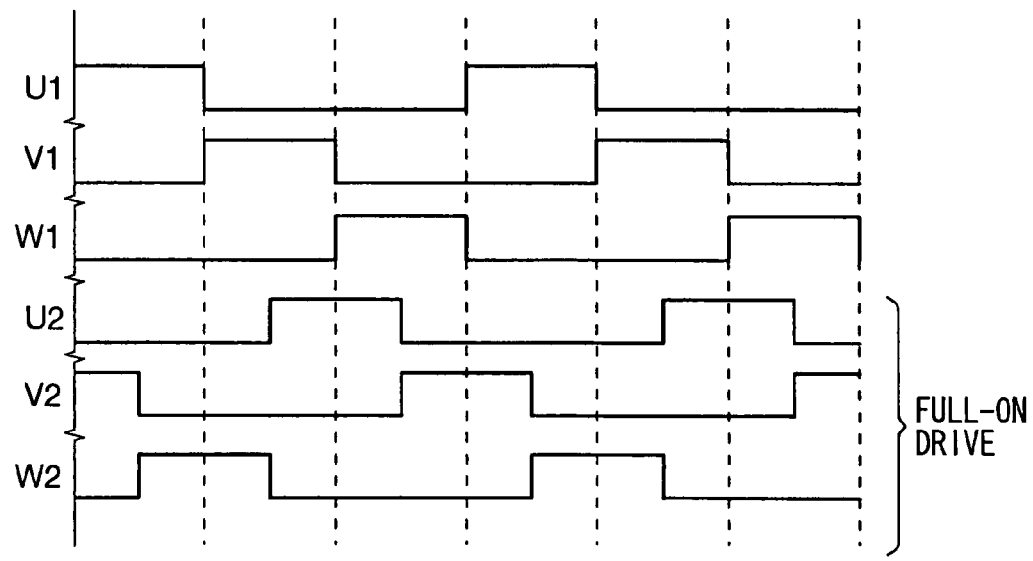
FIGS. 7A and 7B are voltage waveforms which are applied to gates of individual transistors of an inverter unit in case of subjecting a load to switching drives in three phases, in the fourth embodiment.
Figure 7B:
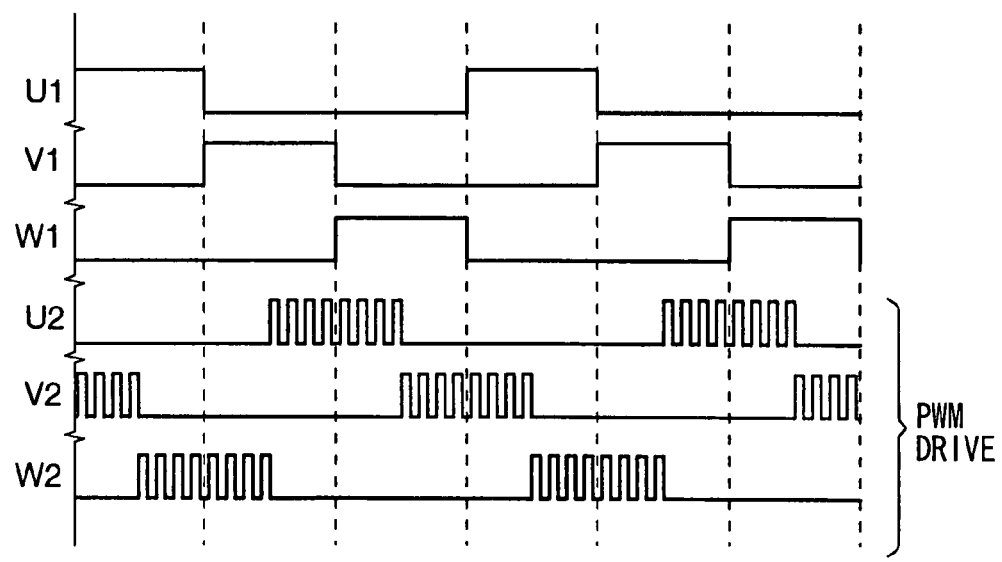

In such a three-phase brushless motor control system S2, the load signals which are inputted to the inverter circuit 26 are generated in waveforms shown in FIG. 7A or FIG. 7B, by the control circuit 22. FIG. 7A or FIG. 7B shows gate voltage waveforms, which are applied to the respective gates of the transistors of the inverter circuit 26 in subjecting the load 30 to the three-phase switching drive. The voltages U1, U2, V1, V2, W1 and W2 shown in FIG. 7A or FIG. 7B correspond to the gate voltages of the transistors 26a-26f shown in FIG. 6, respectively. Thus, the gate voltage waveforms shown in FIG. 7A are inputted to the inverter circuit 26 in the case of the full-on drive of the load 30, and the gate voltage waveforms shown in FIG. 7B are inputted to the inverter circuit 26 in the case of the PWM drive of the load 30.

In the case of the full-on drive of the load 30, as shown in FIG. 7A, the voltages whose phases shift every 120° are respectively applied to the high-side transistors 26a, 26c, 26e. After the voltages have been applied to the high-side transistors 26a, 26c, 26e, the voltages each of which becomes normally ON in one phase section are respectively applied to the low-side transistors 26b, 26d, 26f. Thus, the low-side transistors 26b, 26d, 26f are subjected to the full-on drive every 120°.

In this case, the switching transistor 21d of the noise filter 21 is in a state where it is turned on by the switch signal generated by the control circuit 22 to short-circuit the second coil C of the coil 21c. Thus, a path which extends via the first coil B of the coil 21c and the switching transistor 21d is formed between the power source 10 and the load 30. In the noise filter 21, accordingly, the noise ascribable to the three-phase switching drive is reduced while the loss of the power source 10 is lowered.

Besides, in the case of the PWM drive of the load 30, as shown in FIG. 7B, the voltages whose phases shift every 120° are respectively applied to the high-side transistors 26a, 26c, 26e in the same manner as in the full-on drive. In addition, after the voltages have been applied to the high-side transistors 26a, 26c, 26e, pulse-shaped voltages each of which corresponds to the PWM drive in one phase section are respectively applied to the low-side transistors 26b, 26d, 26f. Thus, the low-side transistors 26b, 26d, 26f are subjected to the PWM drive every 120°.

In this case, the switching transistor 21d of the noise filter 21 is in a state where it is turned off by the switch signal generated by the control circuit 22. Thus, a path which extends via the first coil B and second coil C of the coil 21c is formed between the power source 10 and the inverter unit 30. Accordingly, the noise filter 21 functions to eliminate the switching noise.

In the case where the load 30 is subjected to the three-phase drive by adopting the three-phase brushless motor as in this embodiment, it has been confirmed that the following advantages are brought forth. First, in the noise filter 21 shown in FIG. 6, it is assumed that the resistance of the first coil B is $R_{L1}$, the on-resistance of the switching transistor 21d is $R_{ON}$. Then, in a case where the relation of $R_{L1} \gg R_{ON}$ is satisfied, the heat generation of the coil 21c is suppressed owing to the turn-on of the switching transistor 21d of the noise filter 21.

Figure 8:
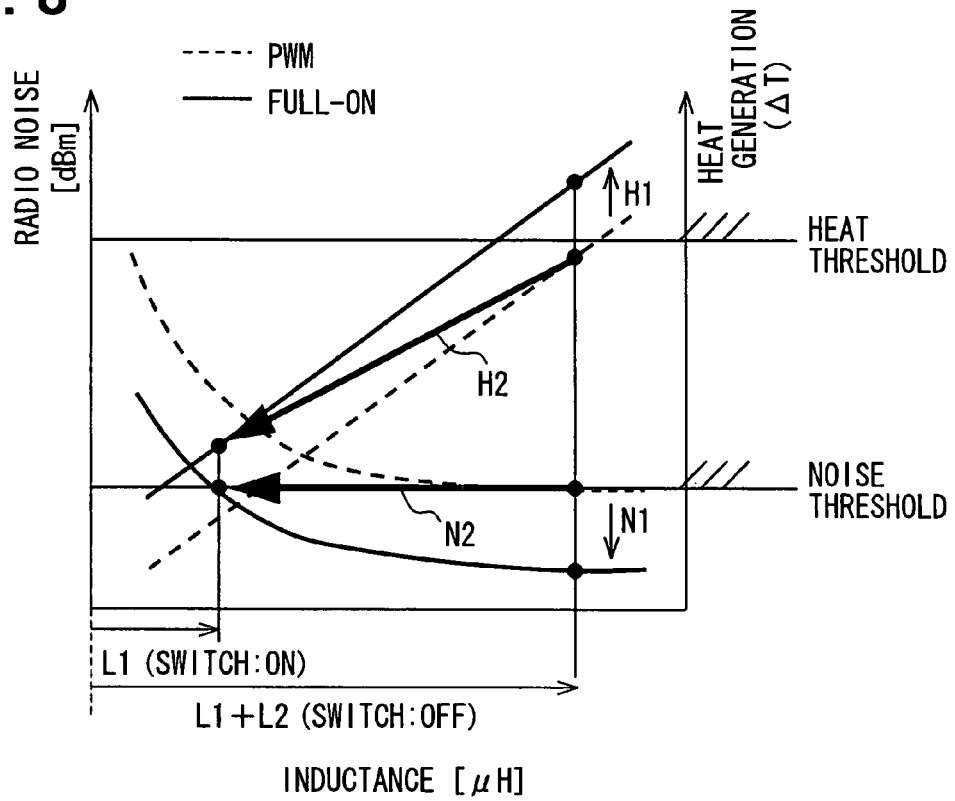
FIG. 8 is a characteristic diagram of a relationship between an inductance and a coil and radio noise and a relationship between the inductance of the coil and heat generation quantity of the coil, at the time when a switching transistor is turned on/off in the fourth embodiment.

FIG. 8 shows a relationship between inductance L of the coil 21c and radio noise (dBm) and a relationship between the inductance L of the coil 21c and heat generation quantity ($\Delta T$) of the coil 21c, at the time when the switching transistor 21d is turned on/off. In the figure, the inductance of the first coil B in the coil 21c is denoted with L1, and that of the second coil C is denoted with L2. Then, in the state where the switching transistor 21d is ON, the path which extends via the first coil B and the switching transistor 21d is formed, and hence, the inductance of the coil 21c becomes L1. On the other hand, in the state where the switching transistor 21d is OFF, the path which extends via the first coil B and the second coil C is formed, and hence, the inductance of the coil 21c becomes (L1+L2).

As shown in FIG. 8, the radio noise is generally in inverse-proportional relationship to the inductance of the coil 21c. Therefore, when the load 30 is changed over from the full-on drive (solid line characteristics) to the PWM drive (dotted line characteristics), the radio noise increases. Besides, the heat generation of the coil 21c is generally in proportional relationship to the inductance L of the coil 21c. Therefore, when the load 30 is changed over from the PWM drive to the full-on drive, the heat generation quantity of the coil 21c increases.

More specifically, in a case where the switching transistor 21d is not included in the noise filter 21 and where the load 30 is changed-over from the PWM drive to the full-on drive, the same state as the state where the switching transistor 21d is OFF (L=L1+L2) is continued, and the load 30 is not subjected to the switching drive, so that the switching noise decreases to enhance the level of the radio noise as shown with an arrow N1 in FIG. 8. Since, however, a current flowing through the load 30 increases, the heat generation of the coil 21c increases as shown with an arrow H1 in FIG. 8.

In contrast, in the case where the switching transistor 21d is included in the noise filter 21 as in this embodiment, the switching transistor 21d is turned on (L=L1) upon the change-over of the load 30 from the PWM drive to the full-on drive, and the path which extends via the first coil B in the coil 21c and the switching transistor 21d is formed. Accordingly, the heat generation quantity of the coil 21c can be greatly decreased as shown with an arrow H2, while the radio noise is held to the same degree as shown with an arrow N2 as in the case where the switching transistor 21*d* is OFF.

Besides, as shown in FIG. 8, the radio noise and the heat generation may be appropriately controlled by setting a prescribed threshold for the radio noise and a prescribed threshold for the heat generation of the coil 21*c*. Specifically, the load 30 is subjected to the full-on drive, and the coil 21*c* is short-circuited by the switching transistor 21*d* so as to have an inductance value satisfying the prescribed threshold of the radio noise, whereby the heat generation of the coil 21*c* can be decreased while the prescribed threshold of the radio noise is satisfied.

As described above, in the case of adopting the three-phase brushless motor as the load 30, even when the load 30 is subjected to the full-on drive, the transistors to be driven are changed over every phase section, and hence, the switching noise occurs. However, the second coil C of the coil 21*c* is short-circuited in the noise filter 21 by the switching transistor 21*d* as shown in FIG. 6, whereby the loss of the power source 10 can be lowered, and further, the noise eliminating function can be maintained.

Besides, in the case of driving the load 30 in three-phase, it is considered that change-over noise ascribable to a frequency for changing-over the turn-on/off of the individual transistors 26*a*-26*e* of the inverter circuit 26 in the respective phases will occur in both the full-on drive and the switching drive. Accordingly, the first coil B of the noise filter 21 is caused to function as the noise filter, in both the drive schemes, whereby the noise at the changeover frequency can be eliminated.

Fifth Embodiment

Figure 9:
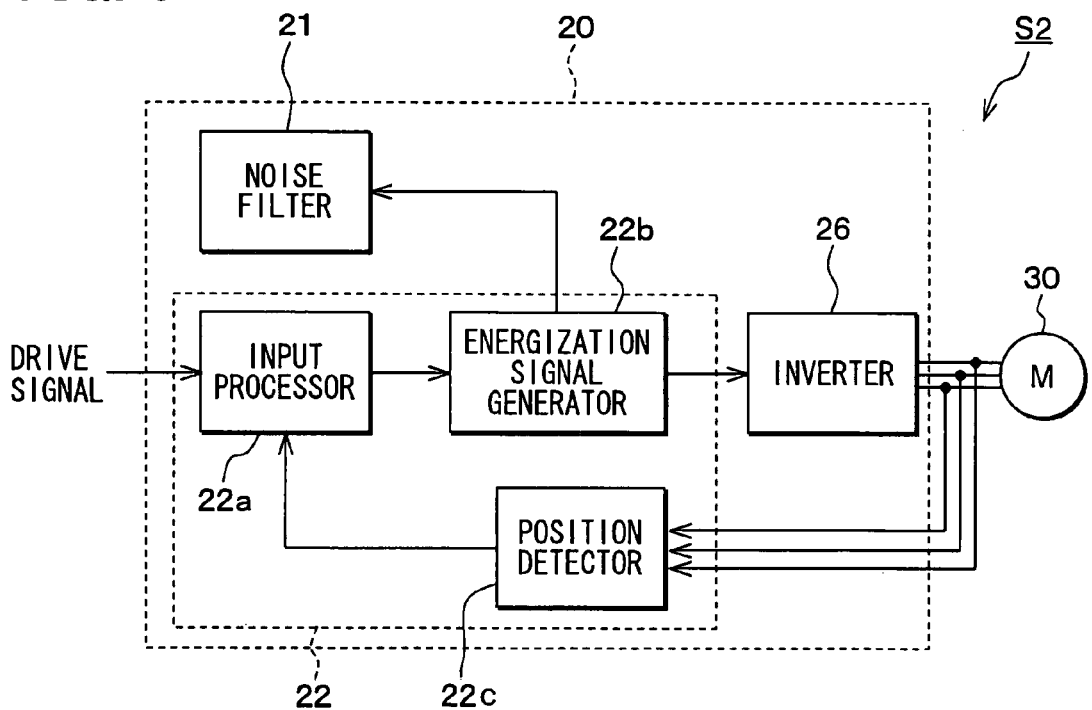
FIG. 9 is a block diagram of a three-phase brushless motor control apparatus according to a fifth embodiment of the invention.

This embodiment is similar to the fourth embodiment, but the control circuit 22 is configured of a custom IC, not a microcomputer as shown in FIG. 9. In this embodiment, the load drive apparatus 20 includes the noise filter 21, the control circuit 22 and the inverter circuit 26. The noise filter 21 is the same as in the fourth embodiment, and it is so configured that the switching transistor 21*d* for short-circuiting the second coil C of the coil 21*c* is connected.

Besides, in this embodiment, the control circuit 22 includes a position detector circuit 22*c*. The position detector circuit 22*c* detects the rotational position of a three-phase brushless motor, which is the load 30. In the control circuit 22, when the energization signal generator circuit 22*b* is fed with the on-signal for subjecting the load 30 to switching drive in three-phase, from the input signal processor circuit 22*a*, it generates the load signal for subjecting the load 30 to the three-phase switching drive, based on the on-signal, and it outputs the load signal to the inverter circuit 26.

In addition, the inverter circuit 26 subjects the load 30 to the full-on drive or the PWM drive in three-phase, in accordance with the load signal inputted from the energization signal generator circuit 22*b*. On this occasion, voltage signals which are outputted from the inverter circuit 26 to the load 30 are fed back to the position detector circuit 22*c* and are used for the detection of the rotational position of the load 30. Besides, rotational position information acquired by the position detector circuit 22*c* is inputted to the input signal processor circuit 22*a* and is used for the correction of the three-phase drive in the generation of the on-signal.

Even when the three-phase brushless motor is adopted as the load 30 and the control circuit 22 is configured of the custom IC, the second coil C of the coil 21*c* can be short-circuited by the switching transistor 21*d* of the noise filter 21, in correspondence with the case of subjecting the load 30 to the full-on drive or the case of subjecting the same to the PWM drive, whereby the loss of the coil 21*c* attributed to the resistance thereof can be lowered.

Other Embodiments

In each of the foregoing embodiments, various modifications and alterations are possible. For example, a filter of LC type may well be adopted as the noise filter 21. All of or part of the N-channel type MOSFETs 21*d*, 24, 26*a*-26*f* may be replaced with P-channel type MOSFETs. The transistor 21*d* may be connected in parallel with, at least, part of the coil 21*c* in the embodiments.

What is claimed is:

1. A load drive apparatus for driving a load with a power source comprising:
   first switch means for controlling supply of power from the power source to the load;
   a noise filter including a coil and second switch means, the coil being connected in series between the power source and the load, and the second switch means being connected in parallel with at least part of the coil; and
   a control circuit for driving the load by turning on or off the first switch means, the control circuit turning off the second switch means thereby to filter noise appearing on a power supply path including the coil, and the control circuit turning on the second switch means thereby to short-circuit at least a part of the coil between the power source and the load, wherein
   the coil includes a first coil and a second coil connected in series to each other;
   the first switch means includes an inverter circuit; and
   the control circuit drives the load by either a full-on drive or a switching drive based on a drive signal applied from an external side;
   the control circuit turns on the second switch means to short-circuit the second coil and provide a power supply path that includes only the first coil, and performs a full-on drive of the load by the inverter circuit, so that the load is full-on driven; and
   the control circuit turns off the second switch means to provide a power supply path that includes both the first coil and the second coil, and performs a switching drive of the load by the inverter circuit, so that the load is switching driven.

2. The load drive apparatus as in claim 1, wherein the control circuit includes:
   energization means for generating a load signal that subjects the load to the full-on drive or the switching drive based on the drive signal, and outputting the load signal to the first switch means thereby to drive the load by the inverter circuit;
   switching drive check means for checking whether the load is under the switching drive based on the load signal generated by the energization means;
   full-on drive means for outputting a switch signal that turns on the second switch means of the noise filter thereby to turn on the second switch means and short-circuit the second coil and to form the power supply path including the first coil and the second switch means between the power source and the inverter circuit, and also for outputting the load signal for subjecting the load to the full-on drive to the inverter circuit in a case that the switching drive check means determines that the load is not under the switching drive; and
   switching drive means for outputting a switch signal that turns off the second switch means of the noise filter thereby to turn off the second switch means and form the power supply path including both the first coil and the second coil between the power source and the inverter circuit, and also for outputting the load signal for subjecting the load to the switching drive to the inverter circuit in a case that the switching drive check means determines that the load is under the switching drive.

3. The load drive apparatus as in claim 1, wherein the control circuit includes:

a position detector circuit, which detects a rotational position of an electric motor as the load;

an input signal processing circuit, which is operated based on the drive signal and a position signal indicative of the rotational position of the load detected by the position detector circuit, to output a switch signal that turns on the second switch means of the noise filter, in a case where the load is subjected to the full-on drive by the inverter circuit, thereby to short-circuit the second coil and to form the power supply path including the first coil and the second switch means between the power source and the inverter circuit, and also to generate an on-signal for subjecting the load to the full-on drive, and to output a switch signal that turns off the second switch means of the noise filter, in a case where the load is subjected to the switching drive, thereby to turn off the second switch means and to form the power supply path including the first coil and the second coil between the power source and the inverter circuit, and also to generate an on-signal for subjecting the load to the switching drive; and an energization signal generator circuit, which responds to the on-signal inputted from the input signal processor circuit, to generate a load signal for subjecting the load to the full-on drive or the switching drive by the inverter circuit and input the load signal to the inverter circuit, thereby to subject the load to the full-on drive or the switching drive by the inverter circuit.

4. The load drive apparatus as in claim 1, wherein:

the load is a three-phase motor;

the inverter circuit includes three paths connected in parallel with each other and in correspondence to three phases of the three-phase motor, respectively, each path having a high-side transistor and a low-side transistor connected in series; and the control circuit is configured to turn on the high-side transistor of one of the three paths and one of the low-side transistors of another and the other of the three paths to drive the motor.

5. The load drive apparatus as in claim 4, wherein:

the control circuit is configured to continuously turn on both the high-side transistor and the low-side transistor thereby to drive the motor by the full-on drive; and the control circuit is configured to turn on the high-side transistor and turn on and off the low-side transistor while the high-side transistor is turned on thereby to drive the motor by the switching drive.

6. The load drive apparatus as in claim 5, wherein:

the control circuit is configured to change the low-side transistors to be turned on from the another of the three paths to the other of the three paths, while the high-side transistor of the one of the three paths is turned on.

* * * * *